R. Pearson,
Bee Hive.
No. 93,340.  Patented Aug. 3, 1869.
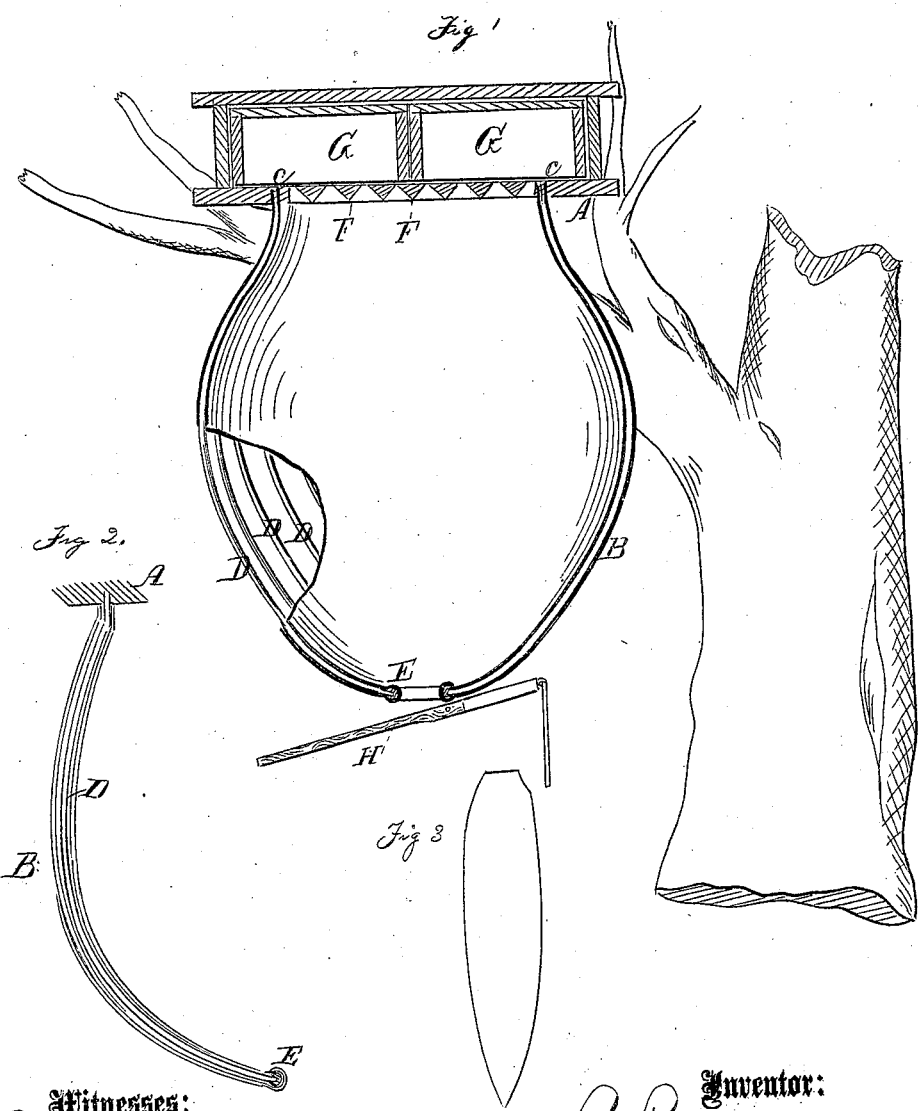
Witnesses:
Geo. W. Mabee
Jno. K. Brooks
Inventor:
R. Pearson
Per Munn & Co
Attys

United States Patent Office.

RICHMOND PEARSON, OF APPLETON, WISCONSIN.

Letters Patent No. 93,340, dated August 3, 1869.

IMPROVEMENT IN BEE-HIVES.

The Schedule referred to in these Letters Patent and making part of the same.

*To all whom it may concern:*

Be it known that I, RICHMOND PEARSON, of Appleton, in the county of Outagamie, and State of Wisconsin, have invented a new and useful Improvement in Bee-Hives; and I do hereby declare that the following is a full, clear, and exact description thereof, which will enable others skilled in the art to make and use the same, reference being had to the accompanying drawing, forming part of this specification.

This invention relates to improvements in the construction of bee-hives, having for its object to provide a simple and cheap method of construction; also, to provide hives better adapted to protect the bees from cold than those now in use.

The invention consists in forming a skeleton-frame, of wire, shaped like an egg, and suspended from the under surface of a honey-board, and covered with paper in a peculiar way, the honey-board being provided with transverse strips for the attachment of the bee-comb, and with passages through it for the bees to have access to boxes above for the honey, all as hereinafter more fully specified.

The drawing represents, in

Figure 1, a sectional elevation of my improved hive, but two thicknesses or layers of paper being shown.

Figure 2 exhibits a section of the side of the hive as I propose to form it. The number of layers of paper may, however, be varied according to climate, location of the hive, with reference to protecting objects, as buildings, walls, &c., and circumstances or conditions.

Figure 3 shows a strip or layer of paper of the form I chiefly employ and deem preferable to render the walls of the hive of equal thickness, as well as cause them to present a more finished or elegant appearance when the same is complete.

A represents the honey-board, which may be of any suitable size, through which I make a large central hole, preferably of circular form, and from which I suspend the body B of the hive, so that the mouth thereof coincides with the said opening.

For connecting the part B, I prefer to spring a hoop, C, into the said opening, and so arrange it that it will project at the lower edge below the surface of the board.

Here I perforate it at stated distances apart with holes for attaching the wires D of the part B.

These wires constitute the ribs or skeleton of the said part, and are bent so as to produce the form represented in the drawing, similar to that of the nests built by hornets.

At the bottom they are connected to a small ring, E, of wire, so as to leave a small central space for the passage into and out of the hives.

These ribs D may be stayed by small wires wound around them, or interwoven with them, in any suitable way to hold them at the proper distance apart.

The frame thus constructed is covered with two or more thicknesses of paper, cut into strips of suitable form for covering, by connecting, by pasting or otherwise, to the frame at the top and bottom only, leaving the intervening portions loose.

When a sufficient number of layers has been thus placed, one or more outer layers are put on and pasted so as to make an air-tight covering.

The interior of the frame is similarly covered, making a fabric of non-heat-conducting material, with air-spaces between the walls, adapted to retain the heat in cold weather to a greater extent than any other fabric known to me.

Across the opening, through the honey-board, I place triangular bars or strips, F, for the attachment of the comb.

Above these bars, I place honey-boxes, G, for the deposit of the honey.

These boxes and the covering for them may be arranged in any preferred way.

A hinged door, H, is provided for the opening at the bottom, so as to be closed by a cord or weight. It is prolonged to form a place for the bees to alight.

This form of the part B of the hive is best adapted for the bees to expel any intruding insects, as it affords no corners or secure places for the insects to hide, and the declivity of the surface, which is all exposed, gives the intruders but little chance for defending themselves.

Having thus described my invention,

What I claim as new, and desire to secure by Letters Patent, is—

1. A bee-hive, formed mainly of the wire skeleton frame, covered with paper, arranged to enclose air-spaces between the interior and exterior air-tight walls, substantially as specified.

2. The part B of the hive formed of paper strips, secured at the top and bottom only, to form air-tight interior and exterior walls, as specified.

3. The combination, with the part B, of the honey-board, having the bars F, and arranged substantially as specified.

RICHMOND PEARSON.

Witnesses:
MILO COLES,
P. WEINTZ.